United States Patent [19]
Mourey et al.

[11] Patent Number: 5,333,004
[45] Date of Patent: Jul. 26, 1994

[54] ACTIVE MATRIX FLAT DISPLAY

[75] Inventors: Bruno Mourey, Palaiseau; Bernard Hepp, Grenoble, both of France

[73] Assignee: Thomson-LCD, Puteaux, France

[21] Appl. No.: 791,000

[22] Filed: Nov. 12, 1991

[30] Foreign Application Priority Data

Nov. 23, 1990 [FR] France ............... 90 14624

[51] Int. Cl.⁵ .............................. G09G 3/36
[52] U.S. Cl. .............................. 345/92; 359/87
[58] Field of Search .......... 340/719, 784; 359/58, 359/59, 66, 68, 87, 88; 345/90-93, 205, 206

[56] References Cited

U.S. PATENT DOCUMENTS

| | | | |
|---|---|---|---|
| 4,728,172 | 3/1988 | Cannella | 340/784 X |
| 4,753,518 | 6/1988 | Clerc | 359/59 |
| 4,775,861 | 10/1988 | Saito | . |
| 5,159,476 | 10/1992 | Hayashi | 359/59 |

FOREIGN PATENT DOCUMENTS

| | | | |
|---|---|---|---|
| 63-31825 | 12/1988 | Japan | . |
| 0073234 | 3/1990 | Japan | 359/59 |
| 0196019 | 8/1991 | Japan | 359/58 |

Primary Examiner—Jeffery Brier
Attorney, Agent, or Firm—Meltzer, Lippe, Goldstein, Wolf, Schlissel & Sazer

[57] ABSTRACT

This invention concerns active matrix flat displays in which the pixels (10) are placed at the intersections between two mutually-perpendicular sets of conductors known as lines (L1 to LN) and columns (C1 to CM). In the invention, each pixel consists of two capacitors (CON1, CON'1) connected in series and consisting of electro-optical components, this circuit being connected between two control transistors (T1, T'1), these two transistors being connected to a common line (L1) and two different columns (C1, C'1) respectively.

6 Claims, 3 Drawing Sheets

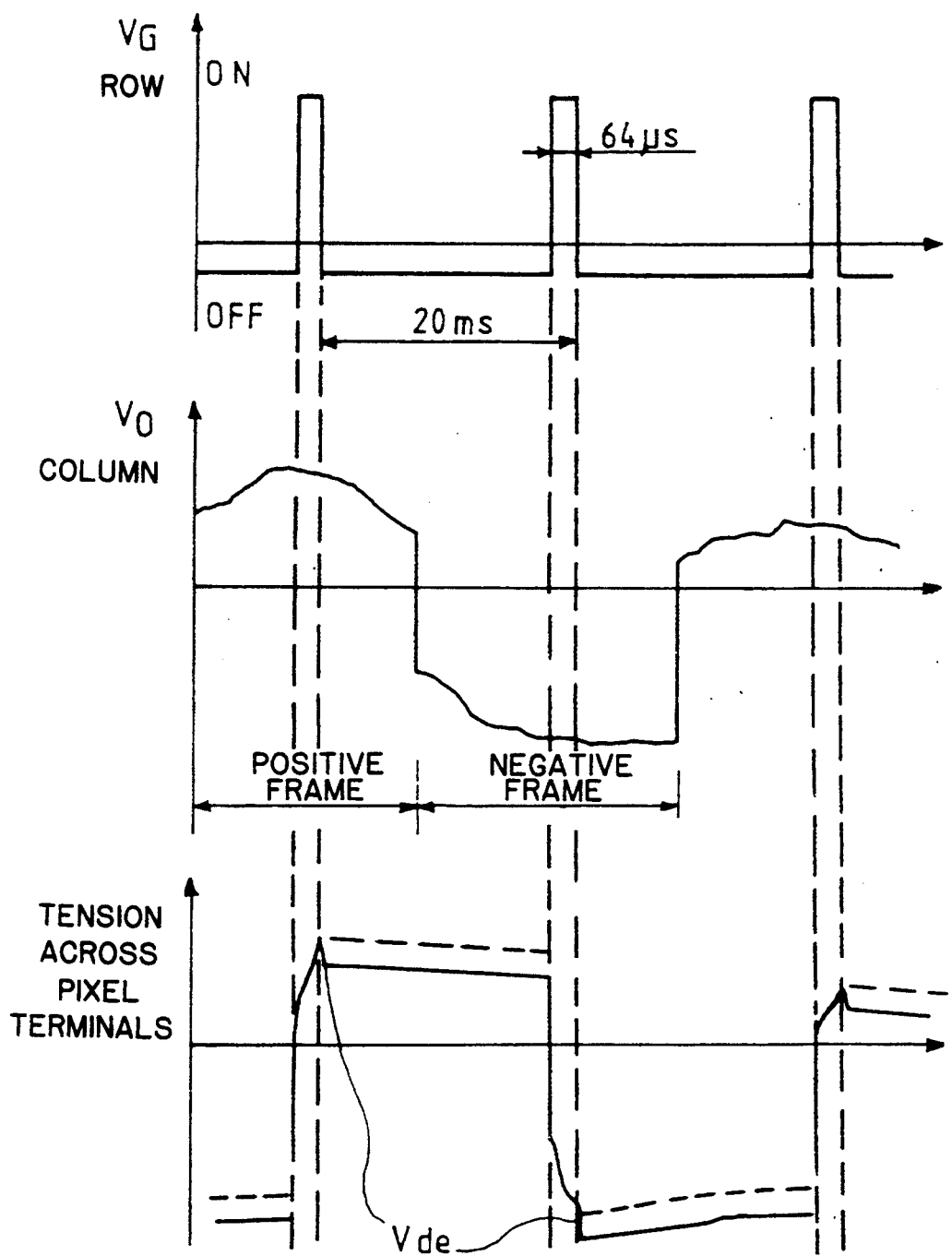

ACTIVE MATRIX FLAT DISPLAY

BACKGROUND OF THE INVENTION

This invention is an active matrix flat display, particularly an active matrix flat display in which each pixel lies at an intersection of a network formed by two sets of mutually perpendicular conductors known as rows and columns and comprises a control transistor connected in series with a capacitor consisting of an electro-optical component such as a liquid crystal.

DESCRIPTION OF THE PRIOR ART

As schematically shown in FIG. 1, a flat active matrix display consists of two mutually-perpendicular sets of conductors known as rows L1, L2, . . . , LN and columns C1, C2, C3 . . . , CM. A pixel 1 is connected at the intersection of each row and column and comprises an actice switching component, in this case a transistor T, connected in series with a capacitor C. Capacitor C consists of an electro-optical component, such as a liquid crystal inserted between two electrodes. In fact, a liquid crystal is equivalent to a capacitor in parallel with a leak resistor, the complete circuit giving a memory effect. However, this resistor is not represented since it has no function in this invention.

In an active matrix flat display, all the components forming columns C1 to CM, rows L1 to LN, control transistors T and one set of electrodes for capacitors C are produced on a substrate while the other set of electrodes for capacitors C is formed by counter-electrodes deposited on another substrate, these two substrates enclosing the liquid crystals. During operation, a DC voltage, such as VCE in the version shown is applied to the counter-electrode. In addition, the gate of transistor T is connected to rows L1 while the electrode of transistor T which is not connected to capacitor C is connected to a column, for example C1. When a voltage exceeding the transistor threshold voltage is applied to row L1, transistor T becomes conductive and capacitor C is charged by data voltage VD or the inverse data voltage −VD applied to column C1. However, stray capacitance $C_{par}$ exists between the row and the pixel as shown on FIG. 1B, which is the basic circuit diagram for a pixel. Consequently, when transistor T switches off, coupling occurs between the row and pixel causing a negative shift in the pixel voltage. Consequently, the voltage on the liquid crystal is not correct.

The general principle of capacitive coupling is as follows: if the voltage in the conductor to which stray capacitance $C_{par}$ couples the pixel varies by DV, capacitive division induces a fraction of this change in the pixel:

$$DU_p = \frac{C_{par}}{C_{par} + C_{LC}}$$

This stray capacitance is due to the capacitance of the basic transistor, the channel capacitance plus the geometric overlap capacitance. It therefore induces a DC voltage shift at the end of the addressing period, i.e., when the transistor switches from ON to OFF. FIG. 1C represents the voltages on the various conductors in the pixel. The solid line shows the real voltage across the liquid crystal terminals while the dotted line is the theoretical value with no capacitive coupling to the voltage across the liquid crystal terminals; $V_{de}$ is the voltage shift due to capacitive coupling.

This voltage shift obviously depends on the transistor geometry but mainly on the capacitance of liquid crystal $C_{LC}$. However, this capacitance varies depending on whether the liquid crystal is ON or OFF and is, consequently, not constant for all pixels; it is, therefore, very difficult to compensate for it.

SUMMARY OF THE INVENTION

This invention proposes a new structure for the pixel to overcome the disadvantages mentioned above.

Consequently, this invention is an active matrix flat display in which the pixels are at the intersections between two sets of conductors known as rows and columns, in which each pixel consists of two capacitors, formed by electro-optical components, in series, this circuit being connected between two control transistors, each connected to a common line and to two different columns.

In a first embodiment, each pixel is connected to two columns to which data voltage VD and an inverse data voltage −VD are applied respectively. To avoid any DC voltage through the liquid crystal, voltages VD and −VD are reversed at each frame.

In a second embodiment, each pair of adjacent pixels on a row are connected to a common column to which a fixed voltage is applied. Preferably, this fixed voltage is the counter-electrode voltage.

BRIEF DESCRIPTION OF THE DRAWINGS

The invention will be better understood and other advantages will become clear on reading the following description of two preferred embodiments, this description being based on the appended figures, of which:

FIGS. 1A to 1C, already described, represent the prior art, FIG. 1A being a schematic circuit diagram of an active matrix flat display, FIG. 1B diagram of a basic circuit pixel and FIG. 1C a timing diagram of the signals applied to the display;

To simplify the description, the same components are identified by the same numbers on all figures.

FIG. 2 represents one embodiment of a liquid crystal display complying with this invention. In this case, pixel 10 consists of one transistor T1 with its gate connected to row L1 in the network of mutually-perpendicular conductors and one of its electrodes connected to a column C1, the other electrode being connected to one electrode of capacitor CON1 which represents the electro-optical component, i.e., one of the electrodes deposited on the glass substrate which encloses the liquid crystal in the embodiment shown. The other electrode of capacitor CON1 is a counter-electrode deposited on the second glass substrate enclosing the liquid crystal and is connected in series with a second capacitor, i.e., its counter-electrode is extended to form the counter-electrode for a second capacitor CON'1 which is, in fact, a second electro-optical component. The second electrode of capacitor CON'1 is connected in series with one electrode of a transistor T'1 whose gate is connected to row L1 and whose other electrode is connected to a second column, C'1. Each pixel therefore consists of two capacitors in series connected between two control transistors, themselves connected respectively to two different columns C1 and C'1. In the same way, the adjacent pixel 10 on the line consists of transistors T1 and T'1 connected to capacitors CON1 and CON'1 respectively, these capacitors being connected in series. Transistor T1 is connected to column C2 while transistor T'1 is connected to column C'2.

The voltages applied to columns C1 and C'1 are the data voltage VD and an inverse data voltage −VD respectively, these two voltages reversing at each frame. Consequently, when +VD is applied to C1, −VD is applied to C'1. In addition, the second electrode of capacitors CON1 and CON'1, i.e., the counter-electrode, is at a floating voltage. Consequently, when transistors T1 and T'1 are switched off by applying a voltage below the transistor threshold voltage to row L1, two voltage shifts occur due to capacitive coupling of the electrodes of CON1 and CON'1 but cancel each other out and no DC component is applied to the liquid crystal.

Figure 1A:
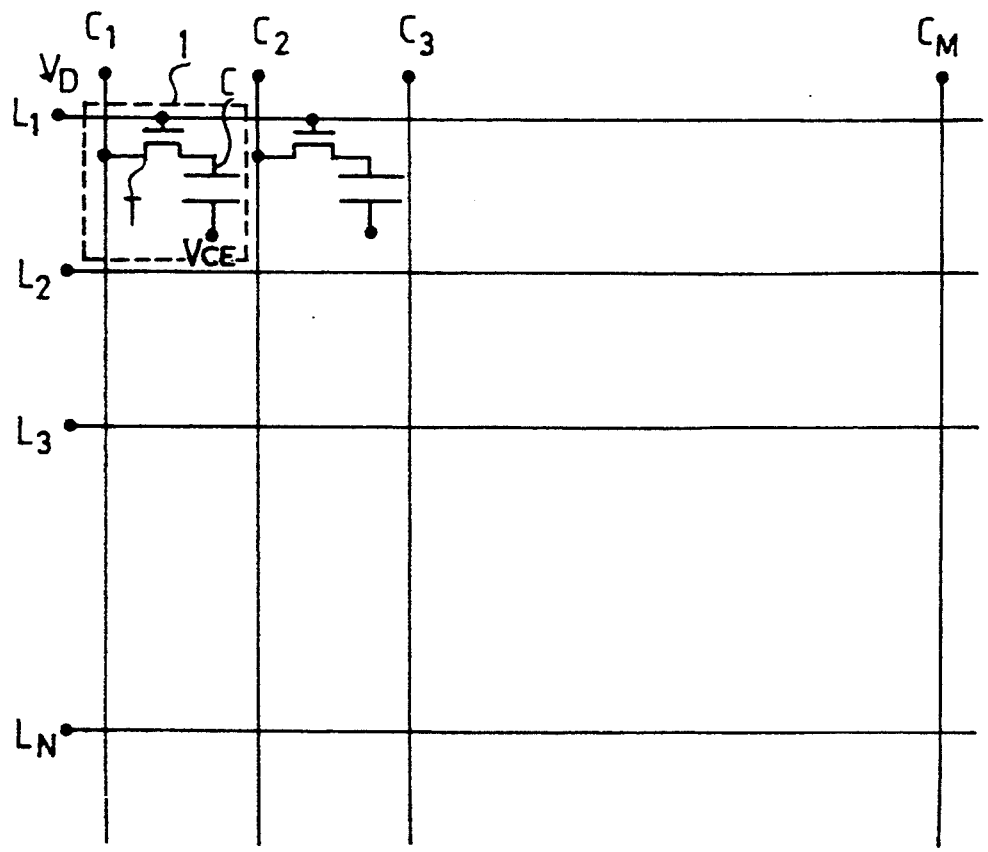
Figure 1B:
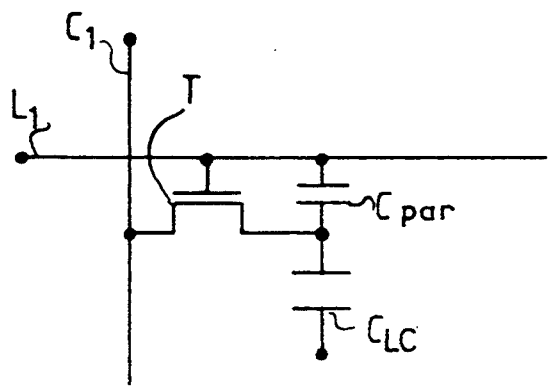
Figure 2:
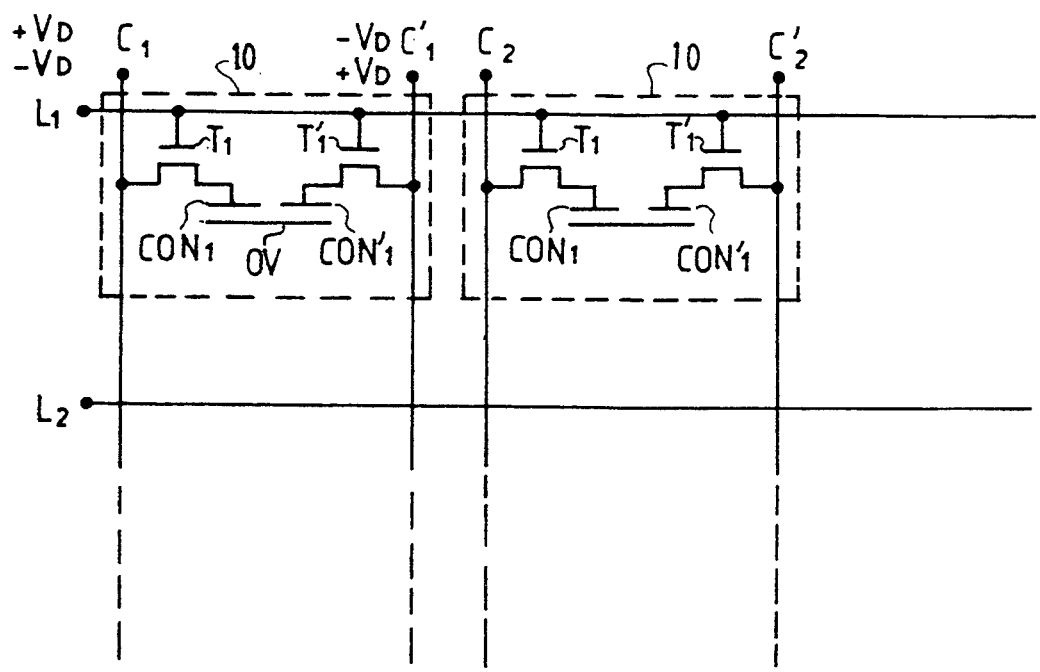
FIG. 2 is a schematic circuit diagram of a matrix display representing a first embodiment of this invention and FIG. 3 is a schematic circuit diagram of an active matrix flat screen representing a second embodiment of this invention.
Figure 3:
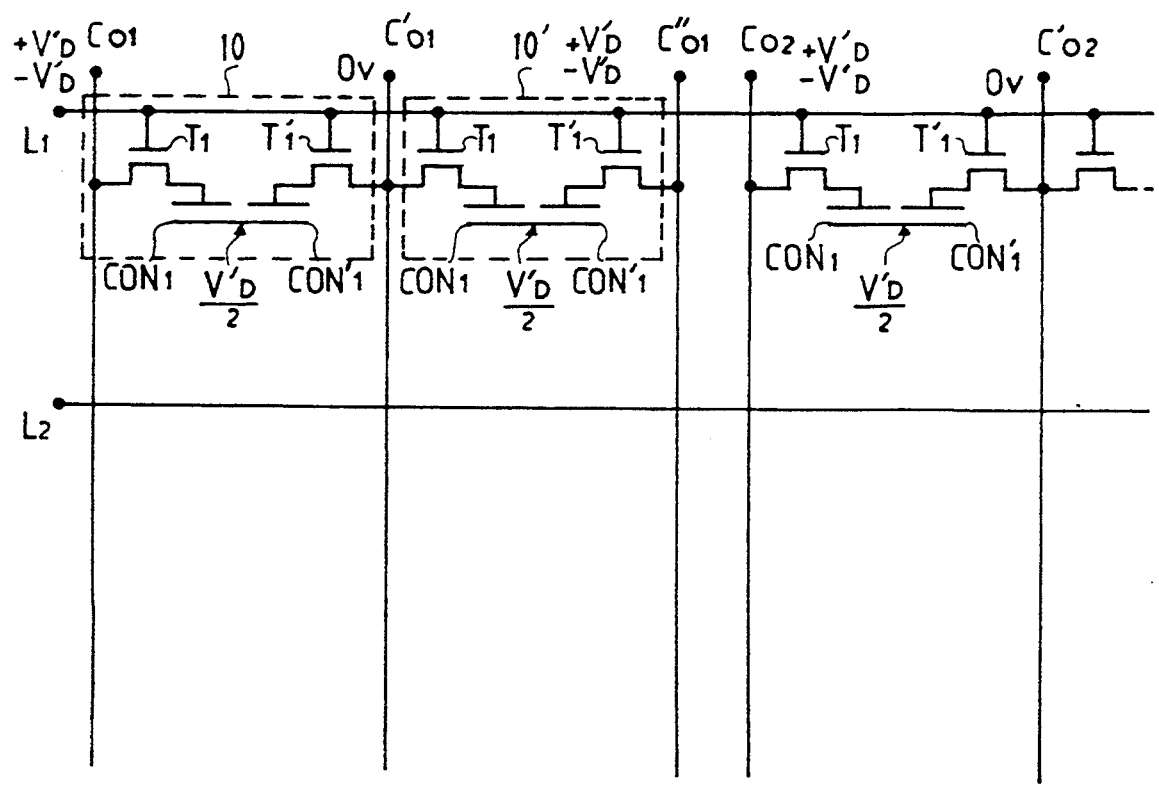

We shall now describe another version of an active matrix flat screen complying with this invention, referring to FIG. 3. In this case, each pixel 10 again consists of two capacitors CON1 and CON'1 in series, capacitor CON1 being connected to a column via a transistor T1 and capacitor CON'1 being connected to another column via transistor T'1. However, in this case, a common column C'01 is used for two pixels 10 and 10' adjacent on a line. This reduces the number of columns required. To be more specific, as shown in FIG. 3, transistor T1 in pixel 10 is connected to column C1 while transistor T'1 in pixel 10 is connected to column C'01. In addition, transistor T1 in pixel 10' is connected to column C'01 while transistor T'1 is pixel 10' is connected to column C''01.

In operation, column C'01 is held at a fixed DC voltage, preferably the counter-electrode voltage, i.e., 0V in the embodiment shown. Data voltages V'D and −V'D are applied to columns C01 and C''01 respectively. Again, the second electrode of capacitors CON1 and CON'1 is at a floating voltage and, when the transistors switch off, they set to a voltage which is virtually the mean between CON1 and CON'1. However, in this case, to obtain correct operation, a voltage V'D, twice as high as the liquid crystal voltage, must be applied to columns C01 and C''01.

It will be obvious to industry that flat displays complying with this invention can be produced using the normal active matrix flat screen technology, that is thin-film technology. Obviously, any equivalent technology could also be used

What is claimed is:

1. An active matrix flat display in which the pixels (10, 10') are placed at the intersection of two mutually-perpendicular sets of conductors known as rows (L1 to LN) and columns (C1 to CM) in which each pixel comprises a pair of capacitors (CON1, CON'1) connected in series and formed by electro-optical components, this pair of capacitors being connected between two control transistors (T1, T'1), these transistors being connected to a common row (L1) and to two different columns respectively (C1, C'1 or C01, C'01, C'01), each individual pixel further comprising an individual counter electrode which is common only to the two capacitors contained in the pixel.

2. A flat display as described in claim 1 in which each pixel (10) is connected to two columns (C1, C'1) with a data voltage VD and an inverse data voltage −VD applied to these two columns respectively.

3. A flat display as described in claim 2 in which voltages VD and −VD reverse at each frame.

4. A flat display as described in claim 1 in which each pair of adjacent pixels (10, 10') on a line is connected to a common column (C'01 to which a fixed DC voltage is applied.

5. A flat display as described in claim 4 in which the fixed DC voltage is the counter-electrode voltage.

6. A flat display as described in claim 1 in which the electro-optical components are liquid crystals.

* * * * *